US009863494B2

(12) United States Patent
Yu et al.

(10) Patent No.: US 9,863,494 B2
(45) Date of Patent: Jan. 9, 2018

(54) SUSPENSION DAMPER (71) Applicant: HONDA MOTOR CO., LTD., Tokyo (JP)

(72) Inventors: Jinghong Yu, Dublin, OH (US); Kirk Rhoades, Dublin, OH (US); Kazutaka Otsu, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 21 days.

(21) Appl. No.: 14/957,416

(22) Filed: Dec. 2, 2015

(65) Prior Publication Data
US 2016/0160955 A1  Jun. 9, 2016

Related U.S. Application Data
(60) Provisional application No. 62/087,055, filed on Dec. 3, 2014.

(51) Int. Cl.
*F16F 9/06* (2006.01)
*F16F 9/32* (2006.01)
(52) U.S. Cl.
CPC ............. *F16F 9/062* (2013.01); *F16F 9/065* (2013.01)
(58) Field of Classification Search
CPC ...... F16F 9/06; F16F 9/44; F16F 9/062; F16F 9/3257; F16F 9/325; F16F 9/466; F16F 9/46; F16F 9/348; F16F 9/096; F16F 15/002; B60G 2202/154; B60G 2202/414; B60G 2202/24; B60G 15/12; B60G 17/0432; B60G 17/08; B60G 17/0416; B60G 2500/114

USPC ....... 188/314, 269, 322.13, 318, 315, 282.8, 188/266.5, 287, 266.2, 266.3, 266.4, 188/266.6, 266.7, 266.8; 267/118, 120
See application file for complete search history.

(56) References Cited

U.S. PATENT DOCUMENTS

| 4,159,756 A | 7/1979 | Murakami et al. |
| 4,746,106 A | 5/1988 | Fukumura |
| 4,761,022 A | 8/1988 | Ohashi et al. |
| 4,802,561 A * | 2/1989 | Knecht ................... F16F 9/465 188/266.6 |
| 4,936,423 A | 6/1990 | Karnopp |
| 4,936,424 A * | 6/1990 | Costa ...................... F16F 9/064 188/314 |

(Continued)

*Primary Examiner* — Robert A Siconolfi
*Assistant Examiner* — San Aung
(74) *Attorney, Agent, or Firm* — Arent Fox LLP (57) ABSTRACT

A suspension damper including an actuator and a static fluid damper is provided. The actuator includes a first housing and a second housing positioned within the first housing and coaxially aligned with the first housing along an axis of the actuator. The second housing defines a passage. A piston is slidably positioned within the passage of the second housing to define a first chamber and a second chamber. A divider is positioned between an inner surface of the first housing and an outer surface of the second housing to define a third chamber and a fourth chamber. The static fluid damper includes a first damping chamber, a second damping chamber, and a third damping chamber. A separating member is positioned within the third damping chamber to define a gas chamber. First and second flow passages provide fluid communication between the actuator and the static fluid damper.

20 Claims, 3 Drawing Sheets

(56) References Cited

U.S. PATENT DOCUMENTS

| | | | |
|---|---|---|---|
| 5,040,645 A * | 8/1991 | Volpel | F16F 9/0209 188/287 |
| 5,375,683 A * | 12/1994 | Huang | F16F 9/46 188/266.6 |
| 5,467,852 A | 11/1995 | De Kock | |
| 5,682,980 A | 11/1997 | Reybrouck | |
| 6,029,958 A * | 2/2000 | Larsson | F16F 9/18 188/282.5 |
| 6,092,816 A | 7/2000 | Sekine et al. | |
| 6,213,263 B1 | 4/2001 | De Frenne | |
| 6,269,918 B1 * | 8/2001 | Kurusu | F16F 9/465 188/266.6 |
| 6,321,887 B1 | 11/2001 | Kurusu et al. | |
| 6,502,837 B1 | 1/2003 | Hamilton et al. | |
| 7,131,654 B2 | 11/2006 | Sakai | |
| 7,240,906 B2 | 7/2007 | Klees | |
| 7,497,452 B2 | 3/2009 | Schedgick | |
| 8,434,771 B2 | 5/2013 | Yu et al. | |
| 2004/0134730 A1 * | 7/2004 | Forster | F16F 9/062 188/314 |
| 2010/0044975 A1 | 2/2010 | Yablon et al. | |
| 2014/0054122 A1 * | 2/2014 | Coaplen | F16F 9/3257 188/322.13 |

* cited by examiner

SUSPENSION DAMPER

RELATED APPLICATIONS

This application claims priority to U.S. Provisional Application No. 62/087,055, filed on Dec. 3, 2014, the entire contents of which are incorporated by reference herein.

BACKGROUND

The subject matter disclosed herein relates to apparatus for suspension damping and, more particularly, to a suspension damper including an actuator and a static fluid damper.

Dampers are well known in the art and have many applications. One common application of dampers is to attenuate vibration in a vehicle body and suspension. At least some conventional suspension dampers include a single piston unit that controls vibration attenuation through a fluid or spring motion. The space required for many conventional suspension dampers undesirably intrudes into the functional spaces of a vehicle. Further, many conventional suspension dampers lack the ability to optimize damping capability to a specific application without significant changes to the design.

A suspension damper configured to optimize the damping effect requiring minimized space while also being configured to apply specific damping is desirable.

SUMMARY

According to one aspect, a suspension damper includes an actuator and a static fluid damper. The actuator includes a first housing having a first end and an opposing second end. A second housing is positioned within the first housing and coaxially aligned with the first housing along an axis of the actuator. The second housing has a first end and an opposing second end and defines a passage between the first end and the second end. A piston is slidably positioned within the passage of the second housing to define a first chamber and a second chamber. A first end cap is coupled to the first end of the first housing and the first end of the second housing. A second end cap is coupled to the second end of the first housing and the second end of the second housing. A piston rod is coupled to the piston and extends through an opening defined through the first end cap. A divider is positioned between an inner surface of the first housing and an outer surface of the second housing to define a third chamber and a fourth chamber. The first chamber is in fluid communication with the third chamber and the second chamber is in fluid communication with the fourth chamber. The static fluid damper includes a first damping chamber, a second damping chamber in fluid communication with the first damping chamber, and a third damping chamber in fluid communication with the second damping chamber. A separating member is positioned within the third damping chamber to define a gas chamber. A first flow passage provides fluid communication between the first damping chamber and the third chamber of the actuator and a second flow passage provides fluid communication between the second damping chamber and the fourth chamber of the actuator. The first chamber, the second chamber, the third chamber, the fourth chamber, the first damping chamber, the second damping chamber, and the third damping chamber are filled with fluid.

According to another aspect, a suspension damper includes an actuator and a static fluid damper. The actuator includes a first housing having a first end and an opposing second end. A second housing is positioned within the first housing and coaxially aligned with the first housing along an axis of the actuator. The second housing has a first end and an opposing second end and defines a passage between the first end and the second end. A piston is slidably positioned within the passage of the second housing to define a first chamber and a second chamber. A first end cap is coupled to the first end of the first housing and the first end of the second housing. A second end cap is coupled to the second end of the first housing and the second end of the second housing. A piston rod is coupled to the piston and extends through an opening defined through the first end cap. A third chamber is defined by the volume between the first housing and the second housing. The first chamber is in fluid communication with the third chamber. The static fluid damper includes a first damping chamber, a second damping chamber in fluid communication with the first damping chamber, and a third damping chamber in fluid communication with the second damping chamber. A separating member is positioned within the third damping chamber to define a gas chamber. A first flow passage provides fluid communication between the first damping chamber and the third chamber of the actuator. A second flow passage provides fluid communication between the second damping chamber and the second chamber of the actuator through an opening in the second end cap. The first chamber, the second chamber, the third chamber, the first damping chamber, the second damping chamber, and the third damping chamber are filled with fluid.

According to a further aspect, a suspension damper includes an actuator and a static fluid damper. The actuator includes a first housing having a first end and an opposing second end. A second housing is positioned within the first housing and coaxially aligned with the first housing along an axis of the actuator. The second housing has a first end and an opposing second end and defines a passage between the first end and the second end. A piston is slidably positioned within the passage of the second housing to define a first chamber and a second chamber. A first end cap is coupled to the first end of the first housing and the first end of the second housing. A second end cap is coupled to the second end of the first housing and the second end of the second housing. A piston rod is coupled to the piston and extends through an opening defined through the first end cap. A third chamber is defined by the volume between the first housing and the second housing. The second chamber is in fluid communication with the third chamber. The static fluid damper includes a first damping chamber, a second damping chamber in fluid communication with the first damping chamber, and a third damping chamber in fluid communication with the second damping chamber. A separating member is positioned within the third damping chamber to define a gas chamber. A first flow passage provides fluid communication between the first damping chamber and the first chamber of the actuator through an opening in the first end cap. A second flow passage provides fluid communication between the second damping chamber and the third chamber of the actuator. The first chamber, the second chamber, the third chamber, the first damping chamber, the second damping chamber, and the third damping chamber are filled with fluid.

BRIEF DESCRIPTION OF THE DRAWINGS

Other aspects and advantages of certain embodiments will become apparent upon consideration of the following detailed description, wherein similar structures have similar reference numerals.

DETAILED DESCRIPTION

Figure 1:
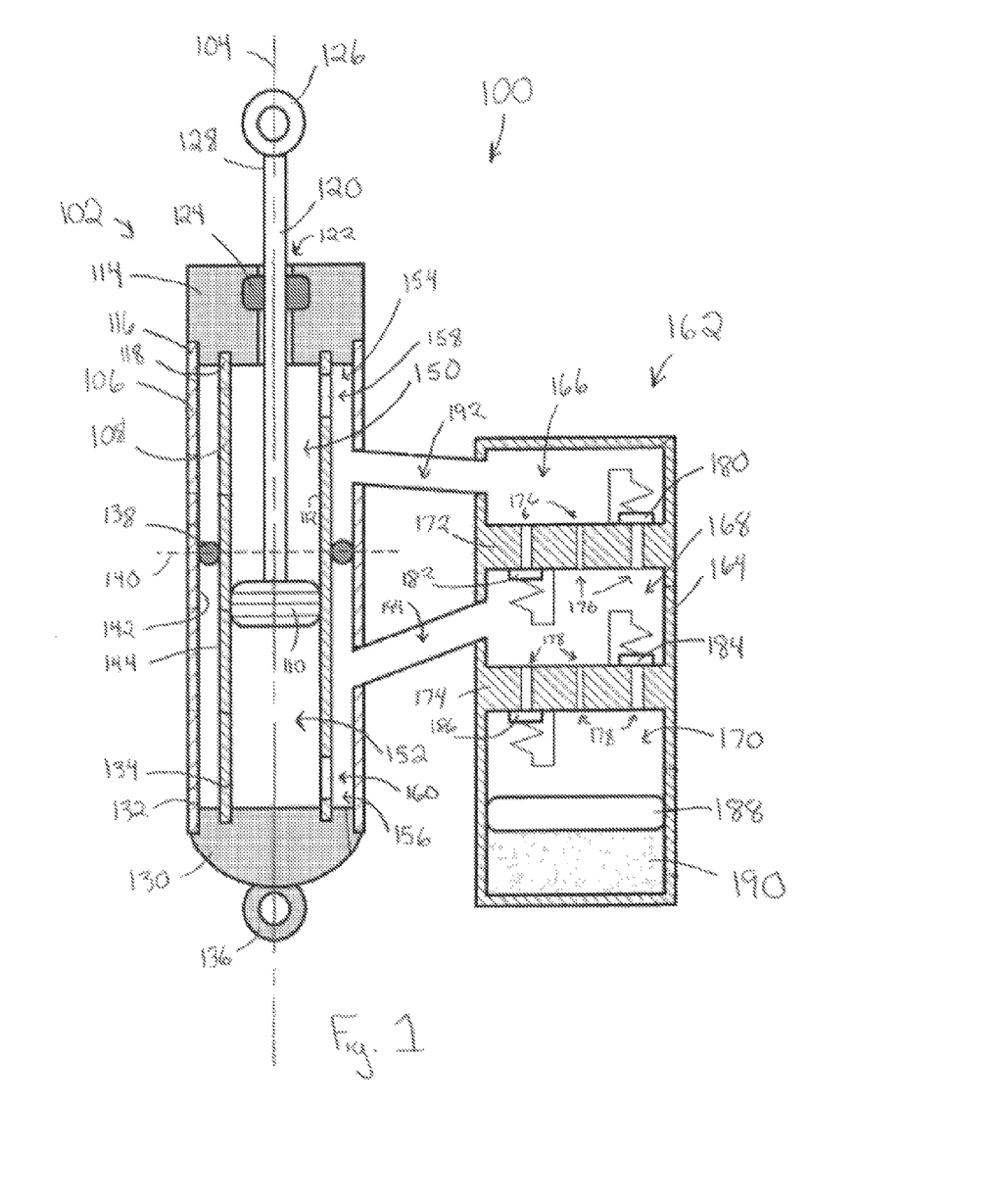
FIG. 1 is a schematic cross-section of an exemplary suspension damper.

Referring initially to FIG. 1, a schematic cross-section of an exemplary suspension damper 100 is depicted. The suspension damper 100 includes a piston-type actuator 102 having a central axis 104. The actuator 102 includes a first housing 106 and a second housing 108 positioned within the first housing 106 and coaxially aligned with the first housing 106 along the central axis 104. A piston 110 is slidably positioned within the second housing 108. In one embodiment, the piston 110 sealingly contacts an inner surface 112 of the second housing 108 and is slidably moveable within the second housing along the central axis 104.

A first end cap 114 is coupled to a first end 116 of the first housing 106 and a first end 118 of the second housing 108. A piston rod 120 is coupled to the piston 110 and extends through an opening 122 defined through the first end cap 114. A seal 124 is disposed within the opening 122 to allow the piston rod 120 to move with respect to the seal 124 along the central axis 104. A first attachment point, such as a first eyelet 126, is formed on or coupled to a distal end 128 of the piston rod 120 opposite the piston 110.

A second end cap 130 is coupled to a second end 132 of the first housing 106 and a second end 134 of the second housing 108. A second attachment point, such as a second eyelet 136, is formed on or coupled to the second end cap 130. In one embodiment, a divider 138 is disposed between the first housing 106 and the second housing 108 at a central plane 140. In this embodiment, the divider 138 contacts an inner surface 142 of the first housing 106 and an outer surface 144 of the second housing 108. In alternative embodiments, the divider 138 is positioned between the first housing 106 and the second housing 108 at a location other than the central plane 140.

As shown in FIG. 1, the piston 110 at least partially defines a first chamber 150 and a second chamber 152 within the second housing 108 and the divider 138 defines a third chamber 154 and a fourth chamber 156 between the first housing 106 and the second housing 108. In this embodiment, the first chamber 150 is in fluid communication with the third chamber 154 through a first aperture 158 defined at or near the first end 118 of the second housing 108. The second chamber 152 is in fluid communication with the fourth chamber 156 through a second aperture 160 defined at or near the second end 134 of the second housing 108.

Still referring to FIG. 1, the suspension damper 100 further includes a static fluid damper 162, which includes a third housing 164. The third housing defines a first damping chamber 166, a second damping chamber 168, and a third damping chamber 170. In the embodiment shown in FIG. 1, the first damping chamber 166 is separated from the second damping chamber 168 by a first wall 172. The second damping chamber 168 is separated from the third damping chamber 170 by a second wall 174. The first damping chamber 166 is in fluid communication with the second damping chamber 168 through one or more passages or apertures 176 defined through the first wall 172. The second damping chamber 168 is in fluid communication with the third damping chamber 170 by one or more passages or apertures 178 defined through the second wall 174.

A first valve 180 and a second valve 182 cover corresponding apertures 176. A third valve 184 and a fourth valve 186 cover corresponding apertures 178. The first valve 180 is configured to prevent or limit fluid flow from the first damping chamber 166 to the second chamber 168 and allow fluid flow from the second damping chamber 168 to the first damping chamber 166. The second valve 182 is configured to allow fluid flow from the first damping chamber 166 to the second chamber 168 and prevent or limit fluid flow from the second damping chamber 168 to the first damping chamber 166. Similarly, the third valve 184 is configured to prevent or limit fluid flow from the second damping chamber 168 to the third chamber 170 and allow fluid flow from third damping chamber 170 to the second damping chamber 168. The fourth valve 186 is configured to allow fluid flow from the second damping chamber 168 to the third chamber 170 and prevent or limit fluid flow from the third damping chamber 170 to the second damping chamber 168. It is understood that the first valve 180, the second valve 182, the third valve 184, and the fourth valve 186 can include any suitable check valve or other suitable valve structure known to one having ordinary skill in the art. In certain embodiments, the number, size, and/or other performance related properties of the valves 180, 182, 184, 186 and the apertures 176, 178 may be controlled or adjusted, e.g., increased or decreased, as means to change the desired fluid flow for different damping effects related to specific applications.

Still referring to FIG. 1, the third damping chamber 170 includes a separating member 188. The third housing 164 and the separating member 188 define a gas chamber 190. The separating member 188 may include a diaphragm, a damper piston, and/or any other flexible and/or movable divider that separates fluid in third damping chamber 170 from gas in gas chamber 190 and allows suspension damper 100 to function as described herein. In one embodiment, the gas chamber 190 is filled with a suitable compressible medium known to one having ordinary skill in the art. Further, a port (not shown) may be included to allow for adding or removing compressible gas within the gas chamber 190 in certain embodiments. A first flow passage 192 and a second flow passage 194 provide fluid communication between the static fluid damper 162 and the actuator 102. In this embodiment, the first flow passage 192 provides fluid communication between the third chamber 154 of the actuator 102 and the first damping chamber 166 of the static fluid damper 162. The second flow passage 194 provides fluid communication between the fourth chamber 156 of the actuator 102 and the second damping chamber 168 of the static fluid damper 162.

It is also contemplated that the first chamber 150, the second chamber 152, the third chamber 154, the fourth chamber 156, the first damping chamber 166, the second damping chamber 168, the third damping chamber 170, the first flow passage 192, and the second flow passage 194 are configured to be filled with a suitable fluid (not shown). It is understood that one having ordinary skill in the art would understand the suitable fluids used to fill the chambers of the actuator 102 and the static fluid damper 162. By controlling one or more properties of the fluid (e.g., viscosity), the damping effect of the piston 110 moving along the central axis 104 may be adjusted for a specific application. Some non-limiting examples of fluid include hydraulic fluid or oil, water, air, and gas. It is further contemplated that the first housing 106, the second housing 108, and the third housing 164 are cylindrical in shape in the embodiment shown in FIG. 1, but in alternative embodiments, the first housing 106, the second housing 108, and/or the third housing 164 may be any suitable shape for any application known to one having ordinary skill in the art.

In certain embodiments, the first attachment point 126 of the piston rod 120 or the second attachment point 136 of the second end cap 130 is coupled to a moving portion of a suspension system (not shown). The opposing end of the actuator 102 is coupled to a non-moving portion of the suspension system or a body portion of a vehicle (not shown). It is contemplated that the position of the static fluid damper 162 relative to the actuator 102 depends on the requirements of the application. In certain embodiments, the static fluid damper 162 is coupled to the first housing 106 in a variety of positions. In other embodiments, the static fluid damper 162 is couple to a moving portion or a non-moving portion of one of the suspension system, a frame or a sub-frame (not shown), or the body portion of the vehicle. Fluid communication between the actuator 102 and the static fluid damper 162 is provided by the first flow passage 192 and the second flow passage 194 regardless of the distance between the actuator 102 and the static fluid damper 162. It is also contemplated that the first flow passage 192 and the second flow passage 194 may be any suitable rigid or flexible tubing known to one having ordinary skill in the art to function as required depending on the application and the environment in which the suspension damper 100 is used.

The flow of fluid in the suspension damper 100 during actuation is as follows. The piston rod 120 drives the piston 110 along the central axis 104 in response to motion imparted by an external application (i.e., device to be damped). The piston 110 pushes fluid out of the first chamber 150 and into the third chamber 154 when the motion imparted is toward the first end cap 114. Fluid flows from the third chamber 154 through the first flow passage 192 into the first damping chamber 166. Fluid flowing into the first damping chamber 166 may flow through one or more apertures 176 that are not covered by a valve into the second damping chamber 168. Also, when sufficient pressure is applied, the second valve 182 allows fluid to flow into the second damping chamber 168. Fluid flowing into the second damping chamber 168 may flow into the second flow passage 194 or through the apertures 178 that are not covered by a valve into the third damping chamber 170. When sufficient pressure is applied, the fourth valve 186 allows more fluid to flow into the third damping chamber 170. Fluid that flows from the second damping chamber 168 into the second flow passage 194 further flows into the fourth chamber 156 of the actuator 102 and then into the second chamber 152 of the actuator 102. When the motion of the piston 110 is reversed to move toward the second end cap 130, the sequence of flow is reversed. Fluid flows from the second chamber 152 into the fourth chamber 156 and through the second flow passage 194 into the second damping chamber 168. Fluid then flows through the apertures 176 not covered by a valve into the first damping chamber 176 and through apertures 178 not covered by a valve into the third damping chamber 170. When enough pressure is exerted by the fluid in the second damping chamber 168, the first valve 180 will open allowing more fluid into the first damping chamber 166 and the fourth valve 186 opens allowing more fluid into the third damping chamber 170. Fluid then flows from the first damping chamber 166 through the first flow passage 192 into the third chamber 154 of the actuator 102 and then into the first chamber 150 of the actuator 102.

From the above description of fluid flow, it is noted that fluid may flow into the third damping chamber 170 regardless of the direction of motion of the piston 110. Fluid flowing into the third damping chamber 170 will act against the separating member 188 and compress the gas in the gas chamber 190. In this embodiment, the amount of compression is a function of the balance between the pressure applied by the fluid entering the third damping chamber 170 and the pressure of the gas in the gas chamber 190. The amount of the compression of the gas in the gas chamber 190 effects the amount of fluid that may enter the third damping chamber 170. When an equilibrium between the gas pressure in the gas chamber 190 and the fluid pressure in the third damping chamber 170 is reached, fluid stops flowing into the third damping chamber 170. When and if the fluid pressure drops in the second damping chamber 168 below the fluid pressure in the third damping chamber 170, the gas pressure in the gas chamber 190 acts on the fluid in the third damping chamber 170 to push fluid through the apertures 170 not covered by a valve. When and if enough force is applied by the fluid, the third valve 184 opens to allow more fluid to flow into the second dampening chamber 168. Fluid flows from the third damping chamber 170 into the second damping chamber 168 until an equilibrium is reached between the fluid pressure and the opposing gas pressure on the separating member 188.

The suspension damper 100 has significant advantages of the prior art and is customizable depending on the desired effect. One having ordinary skill in the art would understand that the actuator 102 could be customized to fit within a space of the application while the static fluid damper is adjusted to meet the damping requirements. The size and/or the number of apertures 176, 178 and the force required to open the valves 180, 182, 184, 186 are means for adjusting the damping effect. Further, the gas pressure in the gas chamber 190 may effect the damping effect.

Figure 2:
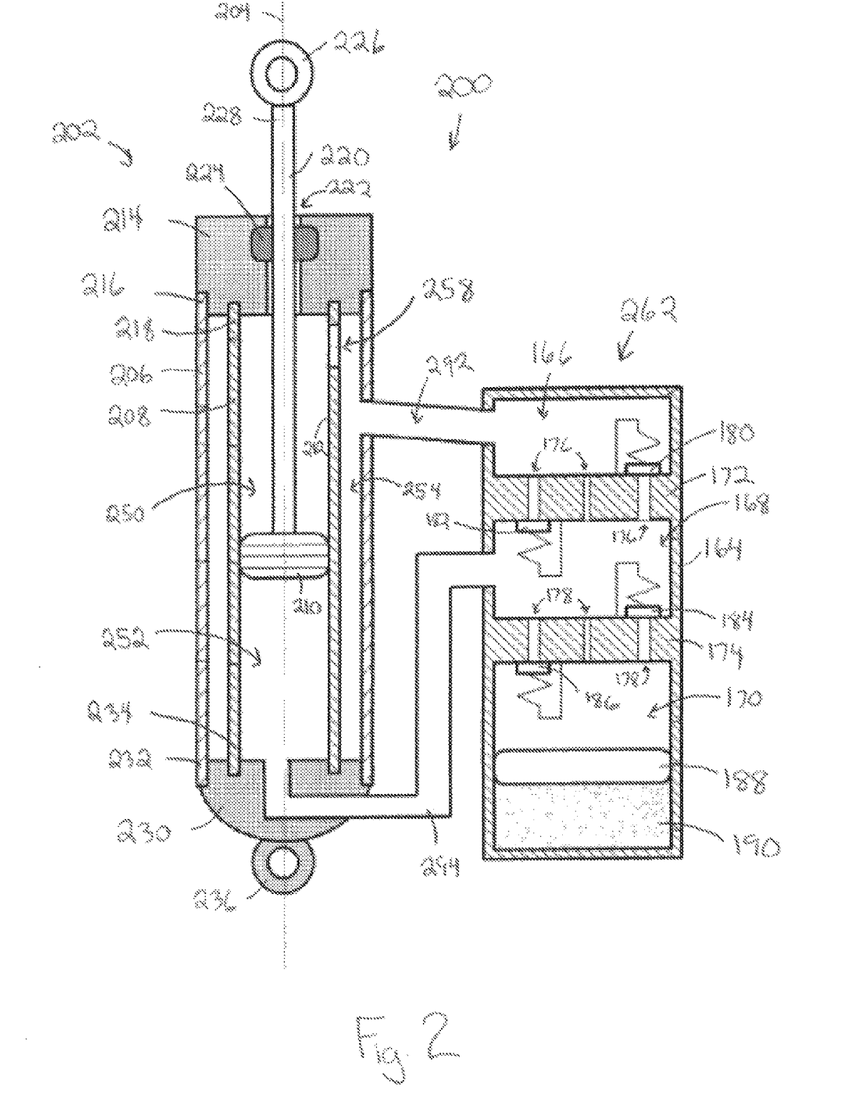
FIG. 2 is a schematic cross-section of an alternative exemplary suspension damper.

Now referring to FIG. 2, a schematic cross-section of another exemplary suspension damper 200 is depicted. The suspension damper 200 includes a piston-type actuator 202 having a central axis 204. The actuator 202 includes a first housing 206 and a second housing 208 positioned within the first housing 206 and coaxially aligned with the first housing 206 along the central axis 204 of the actuator 202. A piston 210 is slidably positioned within the second housing 208. In one embodiment, the piston 210 sealingly contacts an inner surface 212 of the second housing 208 and is slidably moveable within the second housing along the central axis 204. A first end cap 214 is coupled to a first end 216 of the first housing 206 and a first end 218 of the second housing 208. A piston rod 220 is coupled to the piston 210 and extends through an opening 222 defined through the first end cap 214. A seal 224 is disposed within the opening 222 to allow the piston rod 220 to move with respect to the seal 224 along the central axis 204. A first attachment point, such as a first eyelet 226, is formed on or coupled to a distal end 228 of the piston rod 220 opposite the piston 210. A second end cap 230 is coupled to a second end 232 of the first housing 206 and a second end 234 of the second housing 208. A second attachment point, such as a second eyelet 236, is formed on or coupled to the second end cap 230.

As shown in FIG. 2, the piston 210 at least partially defines a first chamber 250 and a second chamber 252 within the second housing 208. A third chamber 254 is defined between the first housing 206 and the second housing 208. In this embodiment, the first chamber 250 is in fluid communication with the third chamber 254 through a first aperture 258 defined at or near the first end 218 of the second housing 208. The suspension damper 200 includes a static fluid damper 262 that is identical to the static fluid damper 162. The elements of the static fluid damper 262 as shown in FIG. 2 identical to corresponding components of the static fluid damper 162 shown in FIG. 1 have been identified with the same number as the corresponding component of the static fluid damper 162 and the description of the static fluid damper 162 as set forth above should be referred to for details.

Still referring to FIG. 2, the suspension damper 200 also includes a first flow passage 292 and a second flow passage 294. The first flow passage 292 provides fluid communication between the third chamber 254 of the actuator 202 and the first damping chamber 166 of the static fluid damper 262. The second flow passage 294 provides fluid communication between the second chamber 252 of the actuator 202 and the second damping chamber 168 of the static fluid damper 262. As shown in FIG. 2, in this embodiment the second flow passage 294 extends through the second end cap 230. In certain embodiments, the second flow passage 294 passes through the first housing 206 and couples to the second housing 208. One having ordinary skill in the art would understand the different configurations possible to provide fluid communication directly between the second chamber 252 of the actuator 202 and the second damping chamber 168 of the static fluid damper 262.

Figure 3:
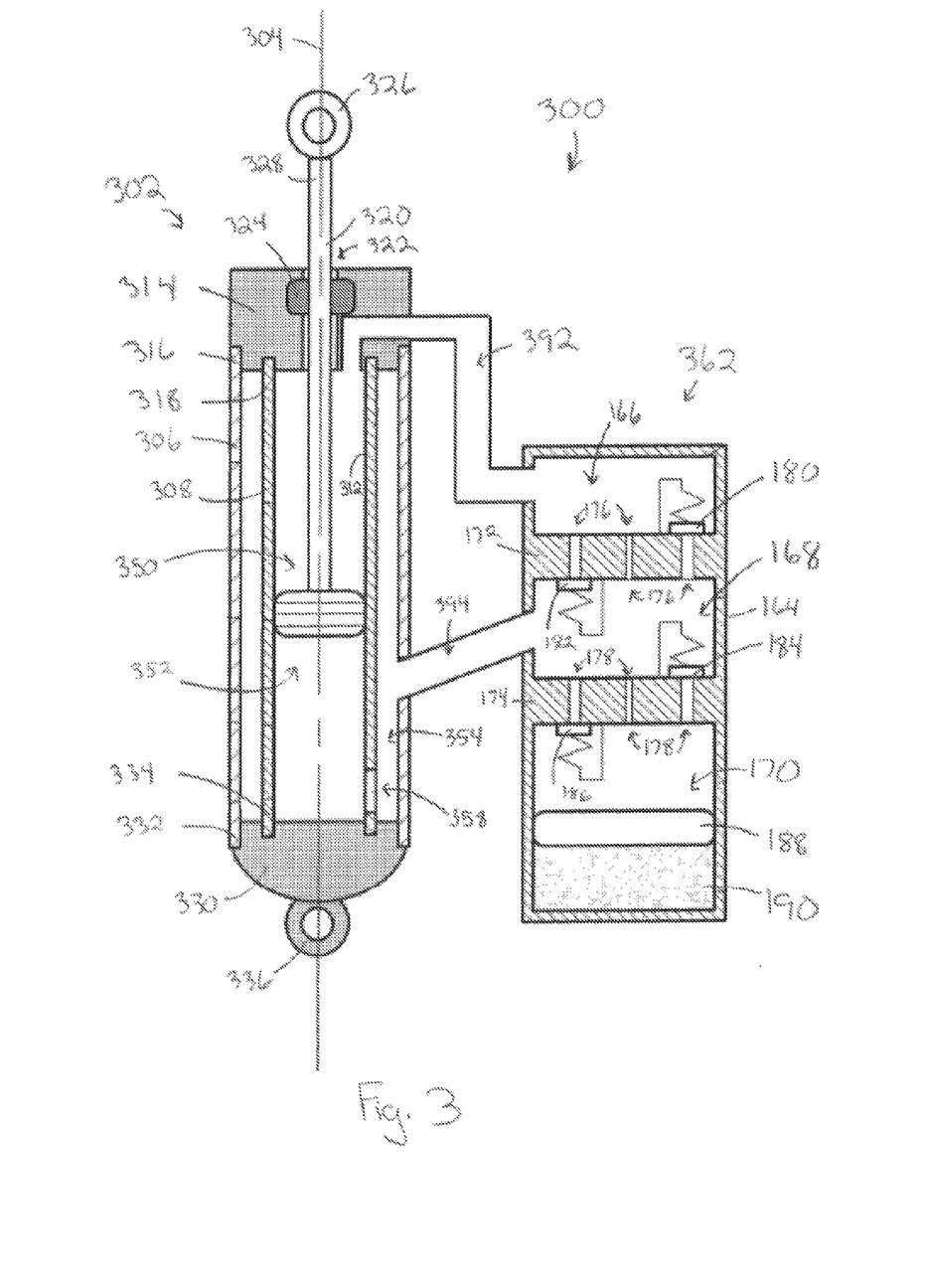
FIG. 3 is a schematic cross-section of another alternative exemplary suspension damper.

Now referring to FIG. 3, a schematic cross-section of another exemplary suspension damper 300 is depicted. The suspension damper 300 includes a piston-type actuator 302 having a central axis 304. The actuator 302 includes a first housing 306 and a second housing 308 positioned within the first housing 306 and coaxially aligned with the first housing 306 along the central axis 304. A piston 310 is slidably positioned within the second housing 308. In one embodiment, the piston 310 sealingly contacts an inner surface 312 of the second housing 308 and is slidably moveable within the second housing along the central axis 304. A first end cap 314 is coupled to a first end 316 of the first housing 306 and a first end 318 of the second housing 308. A piston rod 320 is coupled to the piston 310 and extends through an opening 322 defined through the first end cap 314. A seal 324 is disposed within the opening 322 to allow the piston rod 320 to move with respect to the seal 324 along the central axis 304. A first attachment point, such as a first eyelet 326, is formed on or coupled to a distal end 328 of the piston rod 320 opposite the piston 310. A second end cap 330 is coupled to a second end 332 of the first housing 306 and a second end 334 of the second housing 308. A second attachment point, such as a second eyelet 336, is formed on or coupled to the second end cap 330.

As shown in FIG. 3, the piston 310 at least partially defines a first chamber 350 and a second chamber 352 within the second housing 308. A third chamber 354 is defined between the first housing 306 and the second housing 308. The second chamber 352 is in fluid communication with the third chamber 354 through a first aperture 358 defined at or near the second end 334 of the second housing 308. The suspension damper 300 includes a static fluid damper 362 that is identical to the static fluid damper 162. The elements of the static fluid damper 362 shown in FIG. 3 identical to corresponding components of the static fluid damper 162 shown in FIG. 1 have been identified with the same number as the corresponding component of the static fluid damper 162 and the description of the static fluid damper 162 set forth above should be referred to for details.

As shown in FIG. 3, the suspension damper 300 also includes a first flow passage 392 and a second flow passage 394. The first flow passage 392 provides fluid communication between the first chamber 350 of the actuator 302 and the first damping chamber 166 of the static fluid damper 362. The second flow passage 394 provides fluid communication between the third chamber 354 of the actuator 302 and the second damping chamber 168 of the static fluid damper 362. As shown in FIG. 3, in one embodiment the first flow passage 392 passes through the first end cap 314. In certain embodiments, the first flow passage 392 passes through the first housing 306 and couples to the second housing 308. One having ordinary skill in the art would understand the different configurations possible to provide fluid communication directly between the first chamber 350 of the actuator 302 and the first damping chamber 166 of the static fluid damper 362.

It is further contemplated that the configuration of the suspension dampers 100, 200, 300 may be customized by the location of the first aperture 158, 258, 358 and the second aperture 160. Further, certain embodiments of the suspension dampers 100, 200, 300 may include the first flow passages 192, 292, 392 and the second flow passages 194, 294, 394 in different configurations and locations than depicted in FIGS. 1-3 as long as suitable fluid communication as described above is provided.

It is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather, it is hereby intended the scope be defined by the claims appended hereto. Additionally, the features of various implementing embodiments may be combined to form further embodiments.

What is claimed is:

1. A suspension damper, comprising:
   an actuator including:
   a first housing having a first end and an opposing second end;
   a second housing positioned within the first housing and coaxially aligned with the first housing along an axis of the actuator, the second housing having a first end and an opposing second end and defining a passage between the first end and the second end;
   a piston slidably positioned within the passage of the second housing to define a first actuator chamber and a second actuator chamber;
   a first end cap coupled to the first end of the first housing and the first end of the second housing;

a second end cap coupled to the second end of the first housing and the second end of the second housing;

a piston rod coupled to the piston and extending through an opening defined through the first end cap; and a divider positioned between an inner surface of the first housing and an outer surface of the second housing to define a third actuator chamber and a fourth actuator chamber, wherein the first actuator chamber is in fluid communication with the third actuator chamber and the second actuator chamber is in fluid communication with the fourth actuator chamber; and a static fluid damper including:
a first damping chamber;
a second damping chamber in fluid communication with the first damping chamber;
a third damping chamber in fluid communication with the second damping chamber; and
a separating member positioned within the third damping chamber to define a gas chamber;

wherein
the first damping chamber is not in fluid communication with the third damping chamber;
a first flow passage provides fluid communication between the first damping chamber and the third actuator chamber and a second flow passage provides fluid communication between the second damping chamber and the fourth actuator chamber; and
the first actuator chamber, the second actuator chamber, the third actuator chamber, the fourth actuator chamber, the first damping chamber, the second damping chamber, and the third damping chamber are filled with fluid.

2. The suspension damper of claim 1, wherein the second housing defines at least one aperture between the first actuator chamber and the third actuator chamber.

3. The suspension damper of claim 1, wherein the second housing defines at least one aperture between the second actuator chamber and the fourth actuator chamber.

4. The suspension damper of claim 1, further comprising:
a first valve positioned between the first damping chamber and the second damping chamber and configured to allow fluid to flow from the first damping chamber into the second damping chamber and prevent fluid from flowing from the second damping chamber into the first damping chamber; and
a second valve positioned between the first damping chamber and the second damping chamber and configured allow fluid to flow from the second damping chamber into the first damping chamber and prevent fluid flowing from the first damping chamber into the second damping chamber.

5. The suspension damper of claim 4, further comprising:
a third valve positioned between the second damping chamber and the third damping chamber and configured to allow fluid to flow from the third damping chamber into the second damping chamber and prevent fluid from flowing from the second damping chamber into the third damping chamber; and
a fourth valve positioned between the second damping chamber and the third damping chamber and configured to allow fluid to flow from the second damping chamber into the third damping chamber and prevent fluid flowing from the third damping chamber into the second damping chamber.

6. The suspension damper of claim 1, wherein at least one of the piston rod and the second end cap is coupled to a moving part of a suspension system and the static fluid damper is coupled to a non-moving portion of one of a frame and a sub-frame.

7. The suspension damper of claim 1, wherein at least one of the piston rod and the second end cap is coupled to a moving part of a suspension system and the static fluid damper is coupled to the first housing.

8. The suspension damper of claim 1, wherein the static fluid damper further includes a port in communication with the gas chamber, the port configured to allow a change in gas pressure within the gas chamber.

9. A suspension damper, comprising:
an actuator including:
a first housing having a first end and an opposing second end;
a second housing positioned within the first housing and coaxially aligned with the first housing along an axis of the actuator, the second housing having a first end and an opposing second end and defining a passage between the first end and the second end;
a piston slidably positioned within the passage of the second housing to define a first actuator chamber and a second actuator chamber;
a first end cap coupled to the first end of the first housing and the first end of the second housing;
a second end cap coupled to the second end of the first housing and the second end of the second housing;
a piston rod coupled to the piston and extending through an opening defined through the first end cap; and
a third actuator chamber is defined by the volume between the first housing and the second housing, wherein the first actuator chamber is in fluid communication with the third actuator chamber; and a static fluid damper including:
a first damping chamber;
a second damping chamber in fluid communication with the first damping chamber;
a third damping chamber in fluid communication with the second damping chamber; and
a separating member positioned within the third damping chamber to define a gas chamber;

wherein
the first damping chamber is not in fluid communication with the third damping chamber;
a first flow passage provides fluid communication between the first damping chamber and the third actuator chamber and a second flow passage provides fluid communication between the second damping chamber and the second actuator chamber through an opening in the second end cap; and
the first actuator chamber, the second actuator chamber, the third actuator chamber, the first damping chamber, the second damping chamber, and the third damping chamber are filled with fluid.

10. The suspension damper of claim 9, wherein the second housing defines at least one aperture between the first actuator chamber and the third actuator chamber.

11. The suspension damper of claim 9, further comprising:
a first valve positioned between the first damping chamber and the second damping chamber and configured to allow fluid to flow from the first damping chamber into the second damping chamber and prevent fluid from flowing from the second damping chamber into the first damping chamber; and
a second valve positioned between the first damping chamber and the second damping chamber and configured allow fluid to flow from the second damping chamber into the first damping chamber and prevent fluid flowing from the first damping chamber into the second damping chamber.

12. The suspension damper of claim 11, further comprising:
a third valve positioned between the second damping chamber and the third damping chamber and configured to allow fluid to flow from the third damping chamber into the second damping chamber and prevent fluid from flowing from the second damping chamber into the third damping chamber; and
a fourth valve positioned between the second damping chamber and the third damping chamber and configured to allow fluid to flow from the second damping chamber into the third damping chamber and prevent fluid flowing from the third damping chamber into the second damping chamber.

13. The suspension damper of claim 9, wherein at least one of the piston rod and the second end cap is coupled to a moving part of a suspension system and the static fluid damper is coupled to a non-moving portion of one of a frame and a sub-frame.

14. The suspension damper of claim 9, wherein at least one of the piston rod and the second end cap is coupled to a moving part of a suspension system and the static fluid damper is coupled to the first housing.

15. A suspension damper, comprising:
an actuator including:
a first housing having a first end and an opposing second end;
a second housing positioned within the first housing and coaxially aligned with the first housing along an axis of the actuator, the second housing having a first end and an opposing second end and defining a passage between the first end and the second end;
a piston slidably positioned within the passage of the second housing to define a first actuator chamber and a second actuator chamber;
a first end cap coupled to the first end of the first housing and the first end of the second housing;
a second end cap coupled to the second end of the first housing and the second end of the second housing;
a piston rod coupled to the piston and extending through an opening defined through the first end cap; and
a third actuator chamber is defined by the volume between the first housing and the second housing, wherein the second actuator chamber is in fluid communication with the third actuator chamber; and
a static fluid damper including:
a first damping chamber;
a second damping chamber in fluid communication with the first damping chamber;
a third damping chamber in fluid communication with the second damping chamber; and
a separating member positioned within the third damping chamber to define a gas chamber;
wherein
the first damping chamber is not in fluid communication with the third damping chamber;
a first flow passage provides fluid communication between the first damping chamber and the first actuator chamber through an opening in the first end cap and a second flow passage provides fluid communication between the second damping chamber and the third actuator chamber; and
the first actuator chamber, the second actuator chamber, the third actuator chamber, the first damping chamber, the second damping chamber, and the third damping chamber are filled with fluid.

16. The suspension damper of claim 15, wherein the second housing defines at least one aperture between the second actuator chamber and the third actuator chamber.

17. The suspension damper of claim 15, further comprising:
a first valve positioned between the first damping chamber and the second damping chamber and configured to allow fluid to flow from the first damping chamber into the second damping chamber and prevent fluid from flowing from the second damping chamber into the first damping chamber; and
a second valve positioned between the first damping chamber and the second damping chamber and configured allow fluid to flow from the second damping chamber into the first damping chamber and prevent fluid flowing from the first damping chamber into the second damping chamber.

18. The suspension damper of claim 17, further comprising:
a third valve positioned between the second damping chamber and the third damping chamber and configured to allow fluid to flow from the third damping chamber into the second damping chamber and prevent fluid from flowing from the second damping chamber into the third damping chamber; and
a fourth valve positioned between the second damping chamber and the third damping chamber and configured to allow fluid to flow from the second damping chamber into the third damping chamber and prevent fluid flowing from the third damping chamber into the second damping chamber.

19. The suspension damper of claim 15, wherein at least one of the piston rod and the second end cap is coupled to a moving part of a suspension system and the static fluid damper is coupled to a non-moving portion of one of a frame and a sub-frame.

20. The suspension damper of claim 15, wherein at least one of the piston rod and the second end cap is coupled to a moving part of a suspension system and the static fluid damper is coupled to the first housing.

\* \* \* \* \*